United States Patent
Matsuura et al.

(10) Patent No.: US 10,929,695 B2
(45) Date of Patent: Feb. 23, 2021

(54) OBSTACLE DETECTION APPARATUS

(71) Applicant: DENSO CORPORATION, Kariya (JP)

(72) Inventors: Mitsuyasu Matsuura, Nisshin (JP); Hideki Otsuka, Kariya (JP); Hirohiko Yanagawa, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/584,137

(22) Filed: Sep. 26, 2019

(65) Prior Publication Data

US 2020/0019797 A1    Jan. 16, 2020

Related U.S. Application Data

(63) Continuation of application No. PCT/JP2018/005300, filed on Feb. 15, 2018.

(30) Foreign Application Priority Data

Mar. 28, 2017   (JP) .............................. JP2017-063622

(51) Int. Cl.
| | |
|---|---|
| *G06K 9/00* | (2006.01) |
| *G01S 15/06* | (2006.01) |
| *G01S 15/931* | (2020.01) |

(52) U.S. Cl.
CPC .......... *G06K 9/00805* (2013.01); *G01S 15/06* (2013.01); *G01S 15/931* (2013.01); *G01S 2015/937* (2013.01)

(58) Field of Classification Search
None
See application file for complete search history.

(56) References Cited

U.S. PATENT DOCUMENTS

| | | | | |
|---|---|---|---|---|
| 5,617,085 | A * | 4/1997 | Tsutsumi | ........... G06K 9/00805 340/903 |
| 9,002,511 | B1* | 4/2015 | Hickerson | ............ G05D 1/0253 700/245 |
| 2002/0044048 | A1 | 4/2002 | Watanabe et al. | |
| 2004/0252862 | A1* | 12/2004 | Camus | ............... G06K 9/00805 382/104 |

(Continued)

FOREIGN PATENT DOCUMENTS

| | | | |
|---|---|---|---|
| JP | 2002123818 A | 4/2002 | |
| JP | 2000123298 A | 4/2004 | |

(Continued)

*Primary Examiner* — Curtis J King
(74) *Attorney, Agent, or Firm* — Maschoff Brennan

(57) ABSTRACT

An obstacle detection apparatus includes a distance measuring sensor, an imaging section, and a control section. Based on a reception result of reception waves obtained by the distance measuring sensor, the control section acquires an estimated reflection position in an illuminated region already irradiated with search waves. Based on the estimated reflection position, the control section recognizes an outer shape of an obstacle. Based on an imaging result obtained by the imaging section, the control section performs image recognition of the obstacle. Based on a recognition result of the outer shape of the obstacle and a result of the image recognition, the control section acquires a relative position, with respect to a vehicle, of a portion of the obstacle in an image captured by the imaging section included in a non-irradiated region ahead of the illuminated region in a vehicle traveling direction.

9 Claims, 6 Drawing Sheets

(56) References Cited

U.S. PATENT DOCUMENTS

| | | | | |
|---|---|---|---|---|
| 2010/0030473 | A1* | 2/2010 | Au | G06K 9/00791 |
| | | | | 701/301 |
| 2010/0220189 | A1* | 9/2010 | Yanagi | B60R 1/00 |
| | | | | 348/148 |
| 2012/0083982 | A1* | 4/2012 | Bonefas | G05D 1/0223 |
| | | | | 701/70 |
| 2012/0236122 | A1* | 9/2012 | Fukawa | H04N 5/23212 |
| | | | | 348/46 |
| 2014/0142837 | A1* | 5/2014 | Takaki | G08G 1/166 |
| | | | | 701/301 |
| 2015/0219760 | A1 | 8/2015 | Hiramaki et al. | |
| 2015/0348270 | A1* | 12/2015 | Branz | G06K 9/2054 |
| | | | | 701/70 |
| 2016/0207533 | A1* | 7/2016 | Uechi | B60W 30/09 |
| 2017/0176990 | A1* | 6/2017 | Keller | G01S 17/42 |
| 2017/0205506 | A1* | 7/2017 | Voorheis | G01S 13/66 |
| 2017/0262715 | A1* | 9/2017 | Kozuka | G08G 1/166 |
| 2018/0065664 | A1* | 3/2018 | Watanabe | G05D 1/0212 |
| 2018/0182246 | A1* | 6/2018 | Baba | G06K 9/78 |
| 2018/0329418 | A1* | 11/2018 | Baalke | G08G 1/09623 |
| 2018/0334108 | A1* | 11/2018 | Rotzer | B60R 11/04 |
| 2019/0016340 | A1* | 1/2019 | Bae | B60W 30/14 |
| 2019/0094136 | A1* | 3/2019 | Juette | G01N 21/3554 |
| 2020/0056417 | A1* | 2/2020 | Lee | E05F 1/1091 |

FOREIGN PATENT DOCUMENTS

| | | | |
|---|---|---|---|
| JP | 2007140852 | A | 6/2007 |
| JP | 2009237848 | A | 10/2009 |
| JP | 2012-185011 | A | 9/2012 |
| JP | 2013016052 | A | 1/2013 |
| JP | 2014058247 | A | 4/2014 |
| JP | 2014117989 | A | 6/2014 |

* cited by examiner

OBSTACLE DETECTION APPARATUS

CROSS-REFERENCE TO RELATED APPLICATION

The present application is based on and claims the benefit of priority from earlier Japanese Patent Application No. 2017-63622 filed Mar. 28, 2017, the description of which is incorporated herein by reference.

BACKGROUND

Technical Field

The present disclosure relates to an obstacle detection apparatus configured to be mounted to a vehicle to detect an obstacle that is present outside the vehicle.

Related Art

Various apparatuses of this kind including a distance measuring sensor such as an ultrasonic wave sensor are conventionally proposed.

SUMMARY

As an aspect of the present disclosure, an obstacle detection apparatus is provided which is configured to be mounted to a vehicle to detect an obstacle that is present outside the vehicle. The obstacle detection apparatus includes: a distance measuring sensor configured to transmit search waves toward an outside of the vehicle and receive reception waves that is caused by reflection of the search waves by the obstacle and has intensity dependent on a distance between the vehicle and the obstacle; an imaging section configured to capture an image of surroundings of the vehicle; and a detection processing section configured to detect the obstacle on the basis of a reception result of the reception waves obtained by the distance measuring sensor and an imaging result of the image obtained by the imaging section. The detection processing section is configured to acquire an estimated reflection position on the basis of the reception result, the estimated reflection position being estimated to be a position in an illuminated region already irradiated with the search waves and on the obstacle at which the reception waves have been reflected, recognize an outer shape of the obstacle on the basis of the estimated reflection position, perform image recognition of the obstacle on the basis of the imaging result, and acquire, on the basis of a recognition result of the outer shape and a result of the image recognition, a relative position, with respect to the vehicle, of a portion of the obstacle included in the image captured by the imaging section, the portion of the obstacle being included in a non-irradiated region ahead of the illuminated region in a vehicle traveling direction.

DETAILED DESCRIPTION OF THE PREFERRED EMBODIMENTS

Various apparatuses of this kind including a distance measuring sensor such as an ultrasonic wave sensor are conventionally proposed (see, for example, JP 2013-16052 A and the like).

The apparatuses of this kind are required to acquire as accurately as possible a relative positional relationship between an own vehicle and an obstacle that is present outside the own vehicle.

An embodiment will be described below with reference to the drawings. Various modifications applicable to the embodiment will be collectively described as modified examples after the description of the embodiment.

(Configuration)

Figure 1:
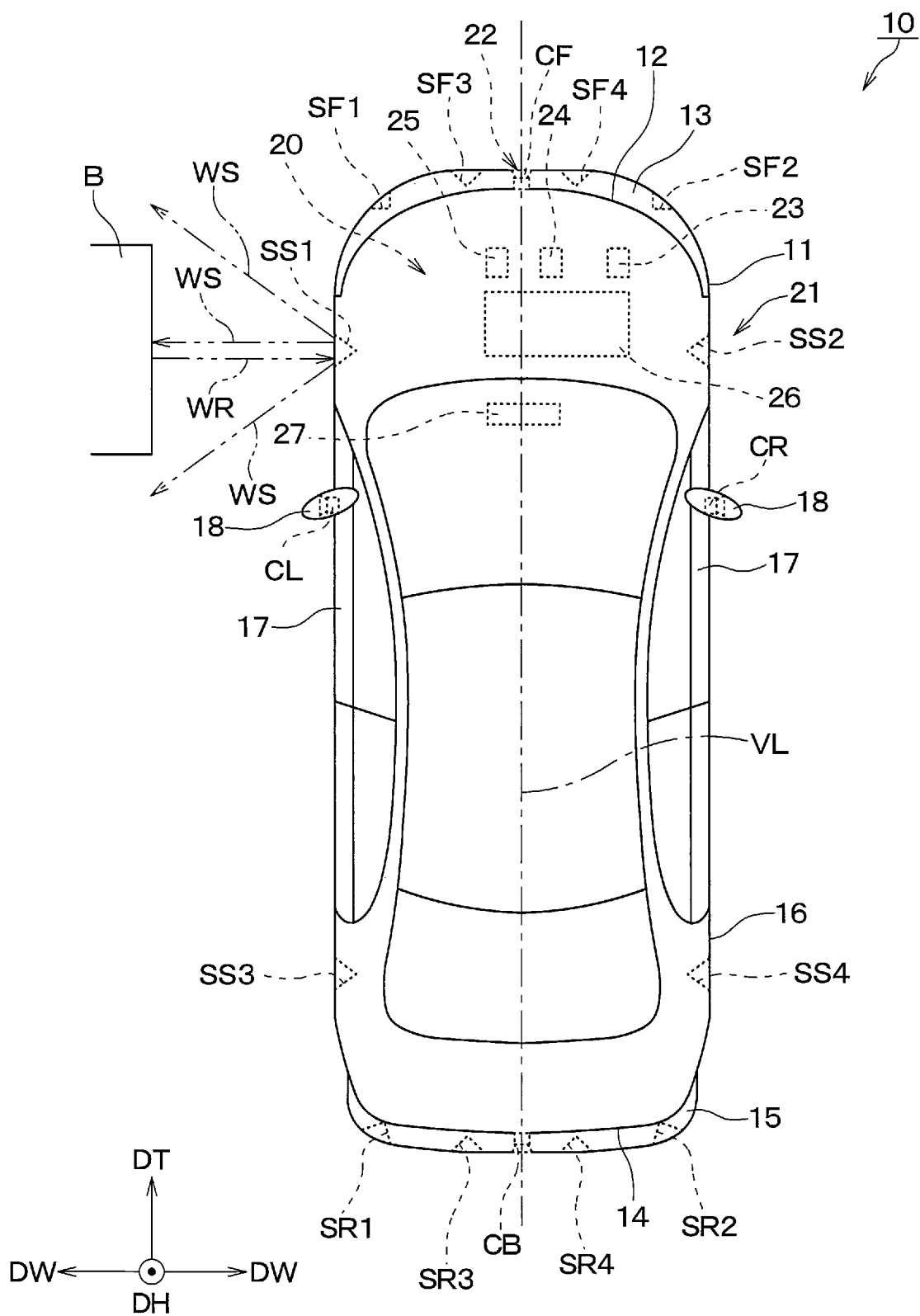
FIG. 1 is a schematic configuration diagram of a vehicle equipped with an obstacle detection apparatus according to an embodiment.

As shown in FIG. 1, the vehicle 10 is a so-called four-wheel automobile, and includes a vehicle body 11 having a substantially rectangular shape in a plan view.

Hereinafter, for convenience, one of directions parallel to a vehicle center line VL which is a direction of movement of the vehicle 10 when the vehicle 10 is traveling forward is referred to as a "vehicle traveling direction". In FIG. 1, the vehicle traveling direction is indicated by an arrow DT. According to this definition, the vehicle traveling direction is a tangential direction of a traveling locus of the vehicle 10 when the vehicle 10 is traveling forward.

Furthermore, a direction that is orthogonal to the vehicle center line VL and defines a vehicle width of the vehicle 10 is referred to as a "vehicle width direction". In FIG. 1, the vehicle width direction is indicated by arrows DW. The vehicle width direction is a direction also orthogonal to a vehicle height direction. The "vehicle height direction" is a direction opposite to a direction of gravity when the vehicle 10 is placed on a horizontal surface. In FIG. 1, the vehicle height direction is indicated by an arrow DH.

Hereinafter, when referring to components of the vehicle 10 or the vehicle body 11, the vehicle traveling direction is referred to as "front" and a direction opposite to the vehicle traveling direction is referred to as "rear". Furthermore, in a left-handed orthogonal three-dimensional coordinate system, when the vehicle traveling direction is an x-axis positive direction and the vehicle height direction is a z-axis positive direction, a y-axis positive direction parallel to the vehicle width direction is referred to as "right", and a direction opposite to the y-axis positive direction is referred to as "left". Definitions of a "front side", a "rear side", a "right side", a "left side", and the like are also equivalent to the above respective definitions.

A front bumper 13 is attached to a front surface portion 12 which is an end on a front side of the vehicle body 11. A rear bumper 15 is attached to a rear surface portion 14 which is an end on a rear side of the vehicle body 11. A door panel 17 is provided to a side surface portion 16 of the vehicle body 11. In a specific example shown in FIG. 1, two door panels 17 are provided on each of left and right sides, i.e., four door panels 17 are provided in total. A door mirror 18 is attached to each of the pair of door panels 17 on the front side.

The vehicle 10 is equipped with an obstacle detection apparatus 20. The obstacle detection apparatus 20 is configured to be mounted to the vehicle 10 so as to be capable of detecting an obstacle B that is present outside the vehicle 10. Specifically, the obstacle detection apparatus 20 includes a distance measuring sensor 21, an imaging section 22, a vehicle speed sensor 23, a shift position sensor 24, a steering angle sensor 25, a control section 26, and a display 27. Details of the components constituting the obstacle detection apparatus 20 will be described below. For simplification of illustration, an electrical connection relationship between the components constituting the obstacle detection apparatus 20 is omitted in FIG. 1.

The distance measuring sensor 21 is configured to transmit search waves WS toward the outside of the vehicle 10 and receive reception waves WR that is caused by reflection of the search waves WS by the obstacle B and has intensity dependent on a distance between the vehicle 10 and the obstacle B. Specifically, in the present embodiment, the distance measuring sensor 21 is a so-called ultrasonic wave sensor, and is configured to be capable of transmitting search waves WS which are ultrasonic waves and receiving reception waves WR including ultrasonic waves. The distance measuring sensor 21 is electrically connected to the control section 26. Thus, the distance measuring sensor 21 is configured to transmit search waves WS under control of the control section 26 and to generate a signal (hereinafter referred to as "reception information") corresponding to a reception result of the reception waves WR and send the signal to the control section 26.

In the present embodiment, a plurality of distance measuring sensors 21 are attached to the vehicle body 11. The plurality of distance measuring sensors 21 are each arranged to be shifted from the vehicle center axis VL toward one side of the vehicle width direction DW. Furthermore, at least one of the plurality of distance measuring sensors 21 are configured to transmit search waves WS along a direction intersecting the vehicle traveling direction.

Specifically, as the distance measuring sensors 21, a first front sonar SF1, a second front sonar SF2, a third front sonar SF3, and a fourth front sonar SF4 are attached to the front bumper 13. Similarly, as the distance measuring sensors 21, a first rear sonar SR1, a second rear sonar SR2, a third rear sonar SR3, and a fourth rear sonar 5R4 are attached to the rear bumper 15. Furthermore, as the distance measuring sensors 21, a first side sonar SS1, a second side sonar SS2, a third side sonar SS3, and a fourth side sonar SS4 are attached to the side surface portion 16 of the vehicle body 11.

The first front sonar SF1 is arranged at a left front corner of the vehicle body 11 so as to transmit search waves WS toward the left front of the vehicle 10. The second front sonar SF2 is arranged at a right front corner of the vehicle body 11 so as to transmit search waves WS toward the right front of the vehicle 10. The first front sonar SF1 and the second front sonar SF2 are symmetrically arranged with respect to the vehicle center line VL.

The third front sonar SF3 is arranged between the first front sonar SF1 and the vehicle center line VL so as to transmit search waves WS toward the substantially front of the vehicle 10. The fourth front sonar SF4 is arranged between the second front sonar SF2 and the vehicle center line VL so as to transmit search waves WS toward the substantially front of the vehicle 10. The third front sonar SF3 and the fourth front sonar SF4 are symmetrically arranged with respect to the vehicle center line VL.

The first rear sonar SR1 is arranged at a left rear corner of the vehicle body 11 so as to transmit search waves WS toward the left rear of the vehicle 10. The second rear sonar SR2 is arranged at a right rear corner of the vehicle body 11 so as to transmit search waves WS toward the right rear of the vehicle 10. The first rear sonar SR1 and the second rear sonar SR2 are symmetrically arranged with respect to the vehicle center line VL.

The third rear sonar SR3 is arranged between the first rear sonar SR1 and the vehicle center line VL so as to transmit search waves WS toward the substantially rear of the vehicle 10. The fourth rear sonar SR4 is arranged between the second rear sonar SR2 and the vehicle center line VL so as to transmit search waves WS toward the substantially rear of the vehicle 10. The third rear sonar SR3 and the fourth rear sonar SR4 are symmetrically arranged with respect to the vehicle center line VL.

The first side sonar SS1 is arranged between the left-side door mirror 18 and the first front sonar SF1 in a front-rear direction of the vehicle 10 so as to transmit search waves WS toward the left of the vehicle 10. The second side sonar SS2 is arranged between the right-side door mirror 18 and the second front sonar SF2 in the front-rear direction of the vehicle 10 so as to transmit search waves WS toward the right of the vehicle 10. The first side sonar SS1 and the second side sonar SS2 are symmetrically arranged with respect to the vehicle center line VL.

The third side sonar SS3 is arranged between the left-rear-side door panel 17 and the first rear sonar SR1 in the front-rear direction of the vehicle 10 so as to transmit search waves WS toward the left of the vehicle 10. The fourth side sonar SS4 is arranged between the right-rear-side door panel 17 and the second rear sonar SR2 in the front-rear direction of the vehicle 10 so as to transmit search waves WS toward the right of the vehicle 10. The third side sonar SS3 and the fourth side sonar SS4 are symmetrically arranged with respect to the vehicle center line VL.

In the present embodiment, the imaging section 22 is a camera including an image sensor such as a charge-coupled device (CCD), and is configured so as to capture an image of surroundings of the vehicle 10 and acquire image information corresponding to the image. The imaging section 22 is electrically connected to the control section 26. Thus, the imaging section 22 is configured to acquire image information under control of the control section 26 and send the acquired image information to the control section 26. In the present embodiment, the vehicle 10 includes a plurality of imaging sections 22, i.e., a front camera CF, a rear camera CB, a left-side camera CL, and a right-side camera CR.

The front camera CF is attached to the front surface portion 12 of the vehicle body 11 so as to acquire image information corresponding to an image of an area in the front of the vehicle 10. The rear camera CB is attached to the rear surface portion 14 of the vehicle body 11 so as to acquire image information corresponding to an image of an area in the rear of the vehicle 10. The left-side camera CL is attached to the left-side door mirror 18 so as to acquire image information corresponding to an image of an area on the left lateral side of the vehicle 10. The right-side camera CR is attached to the right-side door mirror 18 so as to acquire image information corresponding to an image of an area on the right lateral side of the vehicle 10.

The vehicle speed sensor 23, the shift position sensor 24, and the steering angle sensor 25 are electrically connected to the control section 26. The vehicle speed sensor 23 is configured to generate a signal corresponding to a traveling speed of the vehicle 10 (hereinafter simply referred to as a "vehicle speed") and send the signal to the control section 26. The shift position sensor 24 is configured to generate a signal corresponding to a shift position and send the signal to the control section 26. The steering angle sensor 25 is configured to generate a signal corresponding to a steering angle and send the signal to the control section 26.

The control section 26 is provided inside the vehicle body 11. The control section 26 is a so-called in-vehicle microcomputer, and includes a CPU, a ROM, a RAM, a nonvolatile RAM (e.g., a flash ROM), and the like (not shown). Thus, the control section 26 is configured to be capable of performing various control operations when the CPU reads programs (i.e., routines described later) from the ROM or the nonvolatile RAM and executes the programs. Furthermore, various data (an initial value, a look-up table, a map, and the like) used during execution of the programs are stored in advance in the ROM or the nonvolatile RAM.

The control section 26 as a detection processing section is configured to perform an obstacle detection operation on the basis of signals and information received from the distance measuring sensor 21, the imaging section 22, the vehicle speed sensor 23, the shift position sensor 24, and the steering angle sensor 25. The display 27 is arranged in a cabin of the vehicle 10. The display 27 is electrically connected to the control section 26 so that display associated with the obstacle detection operation is performed under control of the control section 26.

Figure 2:
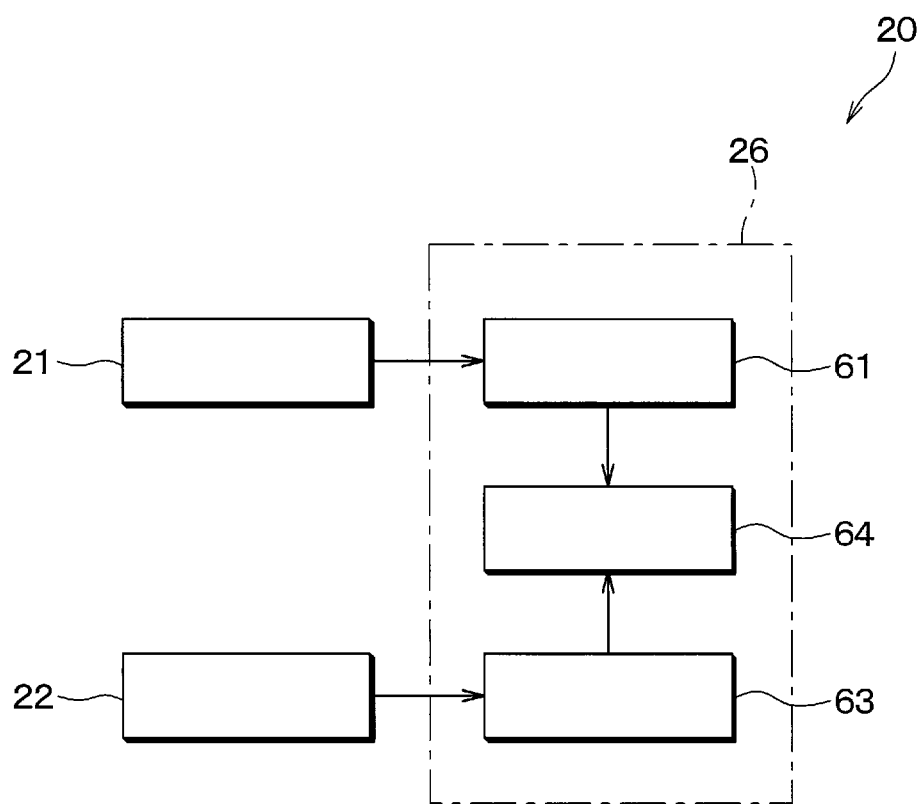
FIG. 2 is a functional block diagram of the obstacle detection apparatus shown in FIG. 1.
Figure 3:
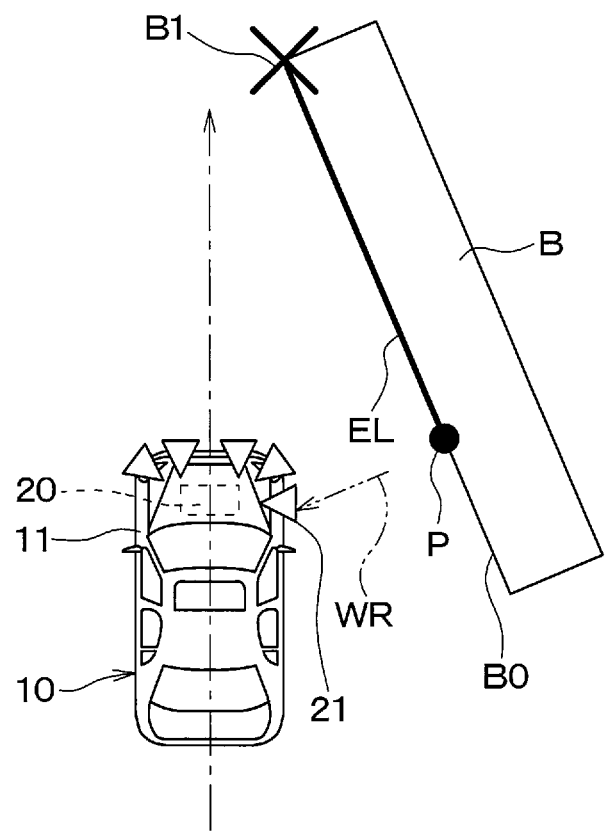
FIG. 3 is a conceptual diagram showing an overview of an operation performed by the obstacle detection apparatus shown in FIG. 1.
Figure 4:
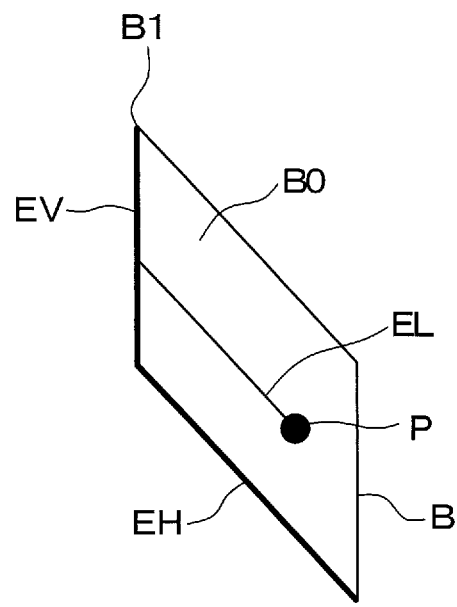
FIG. 4 is a conceptual diagram showing an overview of the operation performed by the obstacle detection apparatus shown in FIG. 1.

Next, with reference to FIGS. 2 to 4, a functional block configuration of the control section 26 as the detection processing section will be described. FIG. 3 shows a state in which the vehicle 10 is approaching the obstacle B that has a wall shape and stands obliquely to the vehicle traveling direction. In FIG. 3, in order to avoid complication of illustration and description, the vehicle 10 is assumed to be traveling straight, and the distance measuring sensor 21 and the like are simplified. The same applies to FIGS. 5 and 6 described later. FIG. 4 shows object shape recognition based on an imaging result obtained by the imaging section 22.

The control section 26 is configured to detect the obstacle B (see, for example, FIG. 3) on the basis of a reception result of the reception waves WR obtained by the distance measuring sensor 21 and an imaging result of the image obtained by the imaging section 22. Specifically, as shown in FIG. 2, the control section 26 includes a shape recognition section 61, an image recognition section 63, and an integrated recognition section 64.

The shape recognition section 61 as an estimated reflection position acquisition section is configured to acquire an estimated reflection position P on the basis of a reception result of the reception waves WR obtained by the distance measuring sensor 21. Furthermore, the shape recognition section 61 is configured to be capable of sequentially acquiring an estimated reflection position P while the vehicle 10 is moving.

The estimated reflection position P is a position estimated to be a position in an illuminated region and on the obstacle B at which the reception waves WR has been reflected. The illuminated region is a region of the obstacle B that has already been irradiated with the search waves WS while the vehicle 10 is approaching the obstacle B this time. The reception result of the reception waves WR corresponding to the acquired estimated reflection position P includes information on a distance from the vehicle 10 to the estimated reflection position P, i.e., a distance from the distance measuring sensor 21 to the estimated reflection position P. Accordingly, the estimated reflection position P is a virtual position on the obstacle B corresponding to a distance acquired on the basis of the reception result.

Furthermore, the shape recognition section 61 is configured to recognize an outer shape of the obstacle B on the basis of the estimated reflection position P. Specifically, the shape recognition section 61 is configured to recognize a shape of a wall surface B0 of the obstacle B facing the vehicle 10, on the basis of at least one estimated reflection position P sequentially acquired while the vehicle 10 is moving.

The image recognition section 63 is configured to recognize a shape of the obstacle B on the basis of an image captured by the imaging section 22. Specifically, in the present embodiment, the image recognition section 63 is configured to extract a characteristic shape of an edge or the like from image information by a well-known image recognition method.

The integrated recognition section 64 is configured to acquire a relative position of a desired focus portion of the obstacle B with respect to the vehicle 10. Thus, the integrated recognition section 64 is configured to recognize the relative position of the focus portion with respect to the vehicle 10, on the basis of a recognition result of the outer shape obtained by the shape recognition section 61 and an image recognition result obtained by the image recognition section 63.

Specifically, as shown in FIGS. 3 and 4, in the present embodiment, the integrated recognition section 64 is configured to acquire, on the basis of the extracted characteristic shape of the edge or the like and an extension line EL, a relative position, with respect to the vehicle 10, of a portion (e.g., an end B1 in FIG. 3 and a longitudinal edge EV in FIG. 4 corresponding to the end B1) of the obstacle B included in the image captured by the imaging section 22. The portion of the obstacle B is included in a non-irradiated region ahead of the illuminated region in the vehicle traveling direction. The extension line EL is a straight line or a curve formed to extend along the outer shape recognized by the shape recognition section 61 from the estimated reflection position P to a position ahead of the estimated reflection position P in the vehicle traveling direction.

(Operation Overview)

An overview of an operation performed by the obstacle detection apparatus 20 will be described below. In the following description, in addition to the estimated reflection position P shown in FIGS. 3, 4, and 6, the phrase "estimated reflection position P" may be used to collectively refer to a first estimated reflection position P1 and an n-th estimated reflection position PN shown in FIG. 5.

As shown in FIG. 3, while the vehicle 10 is moving, the obstacle detection apparatus 20 (i.e., the control section 26 shown in FIGS. 1 and 2) sequentially acquires an estimated reflection position P on the basis of a reception result of the reception waves WR obtained by the distance measuring sensor 21. Furthermore, the obstacle detection apparatus 20 recognizes an outer shape of the obstacle B on the basis of the acquired estimated reflection position P.

Figure 5:
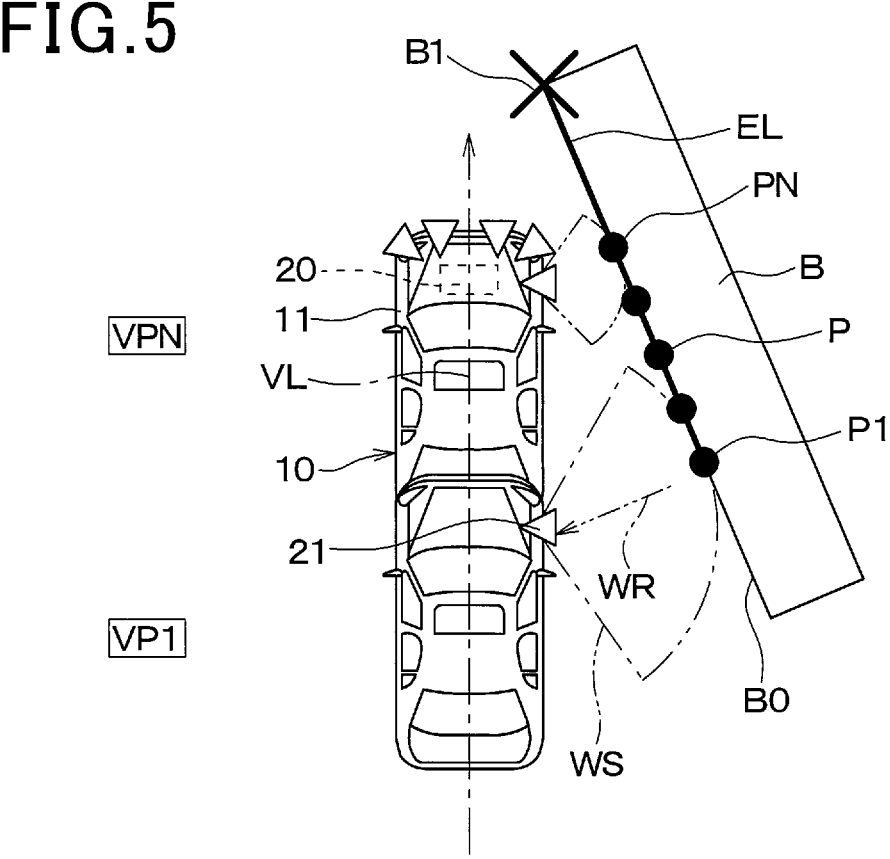
FIG. 5 is a conceptual diagram showing an overview of the operation performed by the obstacle detection apparatus shown in FIG. 1.

Specifically, as shown in FIG. 5, at a time point at which the vehicle 10 reaches a position VP1, the obstacle detection apparatus 20 acquires an estimated reflection position P1. After that, until the vehicle 10 reaches a position VPN, the obstacle detection apparatus 20 acquires N estimated reflection positions P, i.e., estimated reflection positions P1, . . . PN. Note that N is an integer equal to or more than 2.

A method of acquiring the estimated reflection positions P1, . . . PN of the present embodiment will be described by using the acquisition of the estimated reflection position P1 as a representative example. Thus, the N estimated reflection positions P are acquired by a method similar to the method of acquiring the estimated reflection position P1 described below.

At a time point immediately before (e.g., several hundred milliseconds before) the vehicle 10 reaches the position VP1, on the basis of a reception result of the reception waves WR obtained by a specific distance measuring sensor 21 facing the wall surface B0 of the obstacle B, the obstacle detection apparatus 20 acquires a distance between the distance measuring sensor 21 and the wall surface B0. The acquired distance is referred to as a "first distance". In the example in FIG. 5, the "specific distance measuring sensor 21" is the second side sonar SS2 in FIG. 1. Similarly, immediately after that, at the time point at which the vehicle 10 reaches the position VP1, on the basis of a reception result of the reception waves WR obtained by the distance measuring sensor 21, the obstacle detection apparatus 20 also acquires a distance between the distance measuring sensor 21 and the wall surface B0. The acquired distance is referred to as a "second distance".

A time interval between the time at which the first distance is acquired and the time at which the second distance is acquired is sufficiently small. Accordingly, a movement distance of the vehicle 10 during the time interval is also small. Therefore, a position on the wall surface B0 at which the search waves WS has been reflected which corresponds to the first distance can be assumed to be identical to a position on the wall surface B0 at which the search waves WS has been reflected which corresponds to the second distance. Thus, the obstacle detection apparatus 20 acquires, as the estimated reflection position P1, a point of intersection of a first circle whose center is a position of the distance measuring sensor 21 at the time point at which the first distance is acquired and whose radius is the first distance and a second circle whose center is a position of the distance measuring sensor 21 at the time point at which the second distance is acquired and whose radius is the second distance.

Furthermore, the obstacle detection apparatus 20 acquires an extension line EL formed by using the estimated reflection positions P1, . . . PN. The extension line EL is a curve or a straight line acquired using the estimated reflection positions P1, . . . PN by a well-known approximating method such as a method of least squares. Thus, the extension line EL is an approximate curve or an approximate straight line formed by using the N estimated reflection positions P including the first estimated reflection position P1. For example, when N=2, the estimated reflection position P1 is referred to as a first estimated reflection position, and the estimated reflection position PN, i.e., P2, is referred to as a second estimated reflection position. In this case, the extension line EL is a straight line obtained by extending a line segment connecting the first estimated reflection position to the second estimated reflection position. When N=2, the extension line EL passes through all the estimated reflection positions P. On the other hand, when N≥3, the extension line EL does not necessarily pass through all the estimated reflection positions P.

Figure 6:
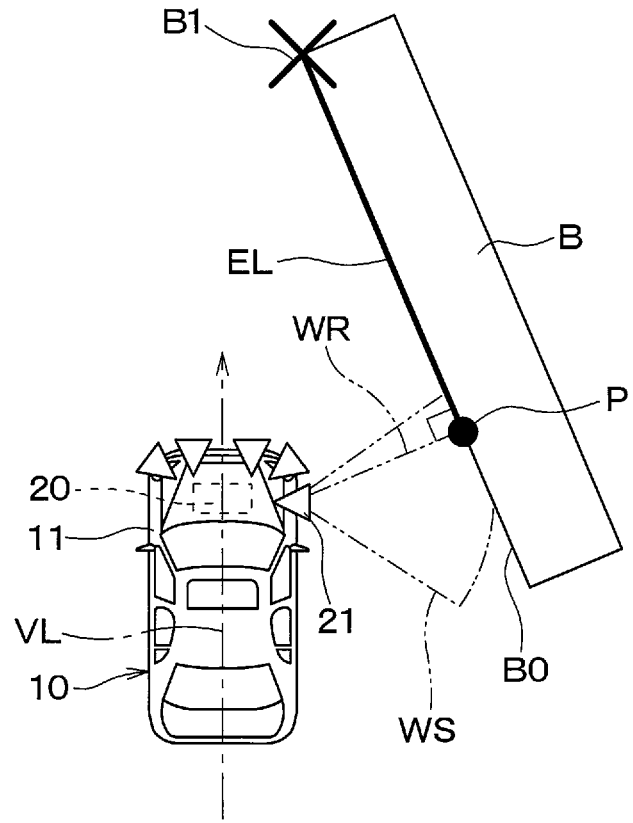
FIG. 6 is a conceptual diagram showing an overview of the operation performed by the obstacle detection apparatus shown in FIG. 1.

Alternatively, the extension line EL may be acquired on the basis of a single estimated reflection position P acquired as described above. Specifically, as shown in FIG. 6, the obstacle detection apparatus 20 acquires, as the extension line EL, a straight line that is orthogonal to a line segment connecting an estimated reflection position P and a distance measuring sensor 21 corresponding to the estimated reflection position P and orthogonal to the vehicle height direction and that passes through the estimated reflection position P. Furthermore, on the basis of the extension line EL, the obstacle detection apparatus 20 recognizes an outer shape of the obstacle B. Thus, the obstacle detection apparatus 20 recognizes the extension line EL as a straight line constituting the wall surface B0 of the obstacle B facing the vehicle 10.

As shown in FIGS. 5 and 6, on the basis of the acquired extension line EL and the image recognition result, the obstacle detection apparatus 20 detects a desired focus portion (e.g., the end B1 or the like) of the obstacle B. Specifically, the obstacle detection apparatus 20 determines whether, in the image captured by the imaging section 22, the longitudinal edge EV is present at a position on the extension line EL that is ahead of the estimated reflection position P in the vehicle traveling direction and is closer to the estimated reflection position P in the vehicle width direction than the vehicle center axis VL is. When the longitudinal edge EV is present on the extension line EL, the obstacle detection apparatus 20 acquires a relative position of the longitudinal edge EV with respect to the vehicle 10 as a position of the end B1 of the obstacle B.

(Operation Examples)

Specific operation examples performed by the configuration of the present embodiment will be described below with reference to flow charts. As shown in FIGS. 3 and 4, the following operation examples show a case where while the vehicle 10 is approaching the obstacle B that has a wall shape and stands obliquely to the vehicle traveling direction, the obstacle detection apparatus 20 detects the end B1 of the obstacle B in the vehicle traveling direction. In the drawings and the following description herein, a "step" is abbreviated to "S". Furthermore, in the following description of the flow charts, the CPU and the nonvolatile RAM of the control section 26 are simply referred to as "CPU" and "nonvolatile RAM", respectively.

Figure 7:
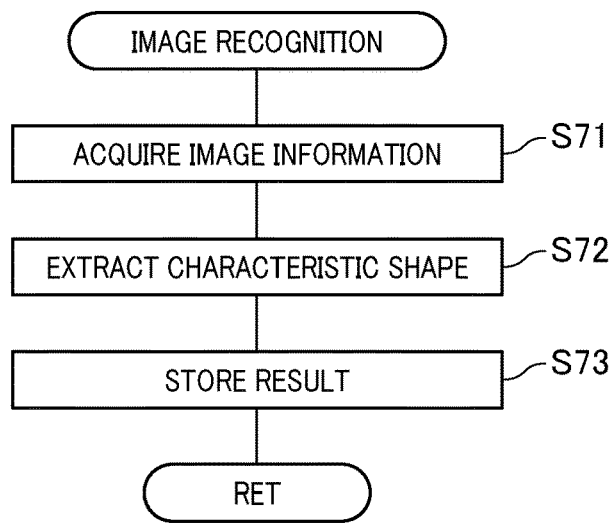
FIG. 7 is a flow chart showing a first operation example performed by the obstacle detection apparatus shown in FIG. 1.
Figure 8:
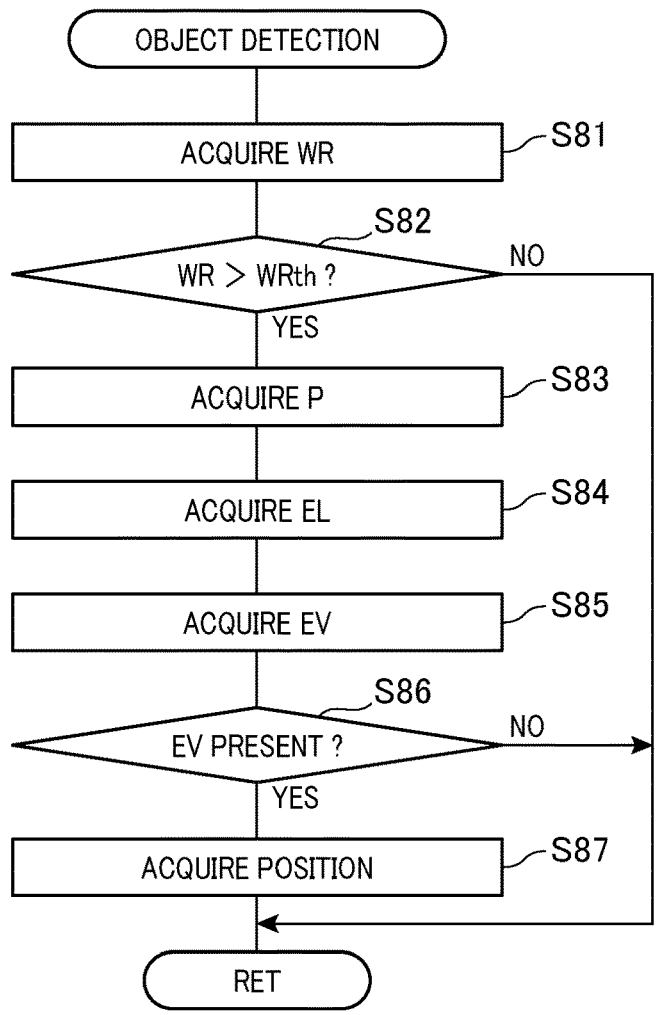
FIG. 8 is a flow chart showing the first operation example performed by the obstacle detection apparatus shown in FIG. 1.

After a predetermined start condition is satisfied, the CPU repeatedly starts an image recognition routine shown in FIG. 7 and an object detection routine shown in FIG. 8 at predetermined time intervals. When the image recognition routine shown in FIG. 7 is started, first, at S71, the CPU acquires image information from the imaging section 22. Next, at S72, the CPU performs an image recognition operation (specifically, edge extraction processing) by the image recognition section 63. Thus, on the basis of the image captured by the imaging section 22, the CPU extracts a characteristic shape of the longitudinal edge EV or the like of the obstacle B. Lastly, at S73, the CPU stores, in the nonvolatile RAM, an image recognition result obtained at S72, i.e., an extraction result of the characteristic shape, and temporarily ends the present routine.

When the object detection routine shown in FIG. 8 is started, first, at S81, the CPU acquires, from the distance measuring sensor 21, reception information, i.e., information corresponding to a reception result of the reception waves WR. Next, at S82, the CPU determines whether intensity of the reception waves WR exceeds a predetermined threshold intensity WRth. If the intensity of the reception waves WR is the predetermined threshold intensity WRth or less (i.e., NO at S82), the CPU skips all processes at S83 and subsequent steps, and temporarily ends the present routine. Thus, the following description of the operation example will be continued assuming that the intensity of the reception waves WR exceeds the predetermined threshold intensity WRth (i.e., YES at S82).

If the intensity of the reception waves WR exceeds the predetermined threshold intensity WRth (i.e., YES at S82), the CPU causes the control to proceed to S83 and the subsequent steps. At S83, the CPU acquires an estimated reflection position P on the basis of the acquired reception information. In the example shown in FIG. 5, during a predetermined time (e.g., 1 second) during which the vehicle 10 is traveling, the CPU acquires a plurality of estimated reflection positions P1, . . . PN. In the example shown in FIG. 6, the CPU acquires a single estimated reflection position P.

Next, at S84, the CPU performs a recognition operation of an outer shape of the obstacle B by the shape recognition section 61. Thus, the CPU acquires an extension line EL on the basis of the at least one acquired estimated reflection position P. Subsequently, at S85, the CPU acquires an extraction result of the longitudinal edge EV of the obstacle B from the information stored in the nonvolatile RAM. Then, the CPU causes the control to proceed to S86.

At S86, the CPU determines whether the longitudinal edge EV is present at a position on the extension line EL that is ahead of the estimated reflection position P in the vehicle traveling direction and is closer to the estimated reflection position P in the vehicle width direction than the vehicle center axis VL is. If the longitudinal edge EV is present on the extension line EL (i.e., YES at S86), the CPU causes the control to proceed to S87. At S87, the CPU acquires a relative position (i.e., an azimuth and a distance) of the longitudinal edge EV with respect to the vehicle 10, and temporarily ends the present routine. On the other hand, when the longitudinal edge EV is not present on the extension line EL (i.e., NO at S86), the CPU skips the process at S87, and temporarily ends the routine.

(Effects)

As shown in FIG. 3, in some cases, the vehicle 10 travels while approaching the obstacle B that has a wall shape and stands obliquely to the vehicle traveling direction.

In this case, when object shape recognition is performed by using the distance measuring sensor 21, if the end B1 of the obstacle B in the vehicle traveling direction is present outside an irradiation range of the search waves WS, the end B1 is difficult to be recognized. Accordingly, when only the object shape recognition using the distance measuring sensor 21 is performed, it is difficult to determine whether if the vehicle 10 keeps traveling, there is a probability that the end B1 is in contact with the vehicle body 11. Furthermore, when only the object shape recognition using the distance measuring sensor 21 is performed, if there is a probability that the end B1 is in contact with the vehicle body 11, it is difficult to determine a distance to a point at which the end B1 is to be in contact with the vehicle body 11 or time required for the end B1 to be in contact with the vehicle body 11.

On the other hand, in the present embodiment, the obstacle detection apparatus 20 can properly acquire (i.e., estimate) a position of the end B1 of the obstacle B by integrating the recognition result of the outer shape obtained by using the distance measuring sensor 21 with the recognition result of the characteristic shape obtained by performing image recognition using the imaging result obtained by the imaging section 22. Accordingly, the above determination can be simply and accurately performed. Thus, according to the configuration of the present embodiment, a relative positional relationship between the own vehicle and the obstacle B that is present outside the own vehicle can be acquired as accurately as possible.

Modified Examples

The present disclosure is not limited to the above embodiment. Accordingly, the embodiment may be modified as appropriate. Representative modified examples will be described below. In the following description of the modified examples, only differences from the embodiment will be described. Furthermore, in the embodiment and the modified examples, the same or equivalent portions are given the same reference numerals. Thus, in the following description of the modified examples, with regard to components given the same reference numerals as the embodiment, the descriptions of the embodiment may be employed as appropriate unless a technical contradiction arises or additional explanation is particularly given.

The present disclosure is not limited to the specific apparatus configuration shown in the above embodiment. Thus, for example, the vehicle 10 is not limited to a four-wheel automobile. Specifically, the vehicle 10 may be a three-wheel automobile, or a six-wheel or eight-wheel automobile such as a cargo truck. Furthermore, the type of the vehicle 10 may be an automobile including only an internal combustion engine, an electric automobile or a fuel cell vehicle including no internal combustion engine, or a hybrid automobile. The number of the door panels 17 is not particularly limited.

When the distance measuring sensor 21 is an ultrasonic wave sensor, arrangement and the number of the distance measuring sensors 21 are not limited to those of the above specific example. Thus, for example, when the third front sonar SF3 is arranged at a center position in the vehicle width direction, the fourth front sonar SF4 is omitted. Similarly, when the third rear sonar SR3 is arranged at a center position in the vehicle width direction, the fourth rear sonar SR4 is omitted. The third side sonar SS3 and the fourth side sonar SS4 may be omitted.

The distance measuring sensor 21 is not limited to an ultrasonic wave sensor. Thus, for example, the distance measuring sensor 21 may be a laser radar sensor or a millimeter wave radar sensor.

Arrangement and the number of the imaging sections 22 are not limited to those of the above example. Thus, for example, the left-side camera CL and the right-side camera CR may be arranged at positions different from the door mirror 18. Alternatively, the left-side camera CL and the right-side camera CR may be omitted. Among a plurality of parking assist operations that can be performed by the obstacle detection apparatus 20, a parking mode selection operation can be performed only by using the front camera CF, or only by using the left-side camera CL and the right-side camera CR.

In the above embodiment, the control section 26 is configured such that the CPU reads the programs from the ROM or the like and starts the programs. However, the present disclosure is not limited to such a configuration. Thus, for example, the control section 26 may be a digital circuit configured to be capable of performing the above operation, and may be, for example, an ASIC such as a gate array. Note that ASIC is an abbreviation for APPLICATION SPECIFIC INTEGRATED CIRCUIT.

The present disclosure is not limited to the specific operation examples and process aspects shown in the above embodiment. For example, the recognition result may be stored in a storage medium (e.g., a RAM and/or a magnetic storage medium) other than the nonvolatile RAM.

The calculation or estimation of a distance corresponding to the reception waves WR may be performed by a processor included in the distance measuring sensor 21, or may be performed by the control section 26. The method of acquiring the estimated reflection position P is not limited to the above specific example. For example, the estimated reflection position P can be promptly and simply acquired by assuming that an azimuth of the reception waves WR is a specific azimuth. For example, the specific azimuth may by a center axis direction of a circular cone corresponding to a transmission range of the search waves WS. Alternatively, for example, the specific azimuth may be a direction parallel to one of generating lines of the circular cone ahead of the other generating lines in the vehicle traveling direction. In these cases, the estimated reflection position P can be acquired on the basis of the assumed specific azimuth and the acquired distance.

When the distance measuring sensor 21 is a so-called array sensor (e.g., an ultrasonic wave array sensor), the obstacle detection apparatus 20 can determine the estimated reflection position P by sending search waves WS and receiving reception waves WR accordingly once by a single distance measuring sensor 21, i.e., the second side sonar SS2 in the examples in FIGS. 3 to 6. In this case, the obstacle detection apparatus 20 can acquire the estimated reflection positions P1, ... PN shown in FIG. 5 at higher resolution. Alternatively, the obstacle detection apparatus 20 can complete, in a shorter time, the acquisition of the estimated reflection position P and the extension line EL based on the estimated reflection position P by the method shown in FIG. 6.

In the above specific example, the obstacle detection apparatus 20 includes the plurality of distance measuring sensors 21. Accordingly, when a transmission/reception range for each of the plurality of distance measuring sensors 21 is large, the obstacle detection apparatus 20 can calculate an azimuth of the estimated reflection position P by using a time difference and/or a phase difference between a plurality of reception waves WR received by the plurality of distance measuring sensors 21 adjacent to each other. Also in this case, the obstacle detection apparatus 20 can acquire the estimated reflection positions P1, ... PN shown in FIG. 5 at higher resolution. Alternatively, the obstacle detection apparatus 20 can complete the acquisition of the extension line EL by the method shown in FIG. 6 in a shorter time.

The processing performed by the image recognition section 63 may be a so-called SFM processing. Note that SFM is an abbreviation for Structure From Motion. Thus, the image recognition section 63 may be configured to three-dimensionally recognize a characteristic shape of the obstacle B by using an SFM technique. The SFM technique has already been well known at the time of filing of the present application (see, for example, JP 5012615 B, JP 5714940 B, and the like). Accordingly, detailed descriptions of the SFM technique and the SFM processing are omitted herein.

In this case, the image recognition section 63 is configured to three-dimensionally recognize a shape of the obstacle B on the basis of a plurality of images captured by the imaging section 22 while the vehicle 10 is moving. Furthermore, the integrated recognition section 64 as an end recognition section is configured to acquire a relative position of a desired focus portion of the obstacle B with respect to the vehicle 10. Thus, the integrated recognition section 64 is configured to acquire the relative position of the focus portion with respect to the vehicle 10 on the basis of a recognition result of the outer shape of the obstacle B obtained by the shape recognition section 61 and an image recognition result of the obstacle B obtained by the image recognition section 63.

An operation example corresponding to this modified example will be described with reference to flow charts shown in FIGS. 9 and 10. After a predetermined start condition is satisfied, the CPU repeatedly starts an image recognition routine shown in FIG. 9 and an object detection routine shown in FIG. 10 at predetermined time intervals.

Figure 9:
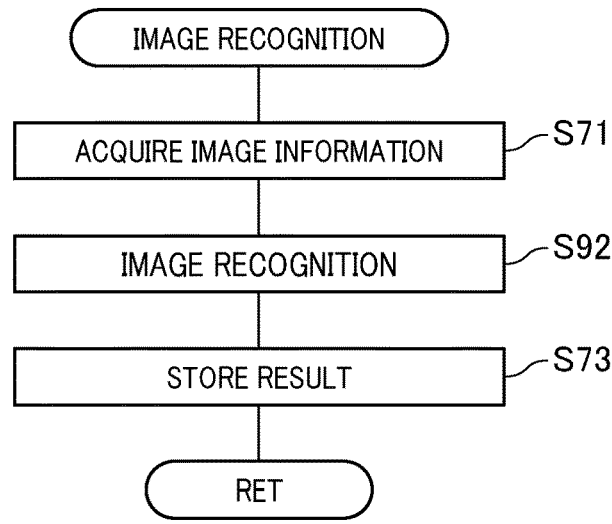
FIG. 9 is a flow chart showing a second operation example performed by the obstacle detection apparatus shown in FIG. 1.

In the image recognition routine shown in FIG. 9, processes at S71 and S73 are similar to those in FIG. 7. Thus, descriptions of these steps are omitted. After the process at S71, the CPU causes the control to proceed to S92. At S92, the CPU performs an image recognition operation, i.e., SFM processing, by the image recognition section 63. Specifically, the CPU recognizes a three-dimensional shape of the obstacle B on the basis of a plurality of images captured by the imaging section 22 while the vehicle 10 is moving. Then, the CPU causes the control to proceed to S73.

Figure 10:
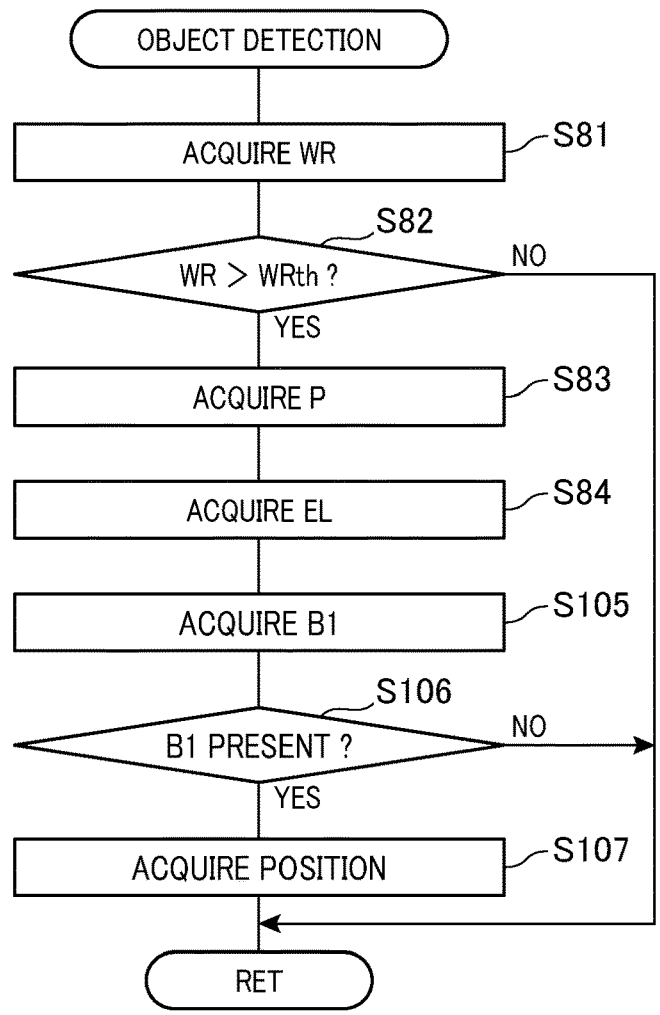
FIG. 10 is a flow chart showing the second operation example performed by the obstacle detection apparatus shown in FIG. 1.

In the object detection routine shown in FIG. 10, processes at S81 to S84 are similar to those in FIG. 8. Thus, description of these steps are omitted. After the process at S84, the CPU causes the control to proceed to S105. At S105, the CPU acquires an extraction result of the end B1 of the obstacle B on the basis of an image recognition result obtained by using the SFM technique and stored in the nonvolatile RAM. Then, the CPU causes the control to proceed to S106.

At S106, the CPU determines whether the end B1 of the obstacle B is present at a position on the extension line EL that is ahead of the estimated reflection position P in the vehicle traveling direction and is closer to the estimated reflection position P in the vehicle width direction than the vehicle center axis VL is. If the end B1 is present on the extension line EL (i.e., YES at S106), the CPU causes the control to proceed to S107. At S107, the CPU acquires a relative position (i.e., an azimuth and a distance) of the end B1 with respect to the vehicle 10, and temporarily ends the routine. On the other hand, if the end B1 is not present on the extension line EL (i.e., NO at S106), the CPU skips the process at S107, and temporarily ends the routine.

The "recognition" of an outer shape of the obstacle B can be reworded as "acquisition" or "estimation" of the outer shape. The "extraction" of a characteristic shape of the obstacle B can be reworded as "recognition" of the characteristic shape. The "acquisition" of a relative position of the end B1 of the obstacle B with respect to the vehicle 10 can be reworded as "estimation" or "calculation" of the relative position. The "acquisition" of the extension line EL can be reworded as "calculation" of the extension line EL.

The greater-than signs in the determination processes may have an equal sign, or may have no equal sign. Thus, for example, "exceeding a threshold" can be changed to "being equal to or greater than a threshold".

The modified examples are also not limited to the above examples. The plurality of modified examples may be combined with each other. Furthermore, the whole or part of the above embodiment may be combined with the whole or part of the modified examples.

According to an aspect of the present disclosure, an obstacle detection apparatus (20) is configured to be mounted to a vehicle (10) to detect an obstacle (B) that is present outside the vehicle.

Specifically, the obstacle detection apparatus includes: a distance measuring sensor (21) configured to transmit search waves toward an outside of the vehicle and receive reception waves that is caused by reflection of the search waves by the obstacle and has intensity dependent on a distance between the vehicle and the obstacle; an imaging section (22) configured to capture an image of surroundings of the vehicle; and a detection processing section (26) configured to detect the obstacle on the basis of a reception result of the reception waves obtained by the distance measuring sensor and an imaging result of the image obtained by the imaging section.

Furthermore, in the obstacle detection apparatus, the detection processing section is configured to acquire an estimated reflection position on the basis of the reception result, the estimated reflection position being estimated to be a position in an illuminated region already irradiated with the search waves and on the obstacle at which the reception waves has been reflected, recognize an outer shape of the obstacle on the basis of the estimated reflection position, and acquire, on the basis of a recognition result of the outer shape and a result of image recognition, a relative position, with respect to the vehicle, of a portion of the obstacle included in the image captured by the imaging section, the portion of the obstacle being included in a non-irradiated region ahead of the illuminated region in a vehicle traveling direction (DT).

What is claimed is:

1. An obstacle detection apparatus configured to be mounted to a vehicle to detect an obstacle that is present outside the vehicle, the obstacle detection apparatus comprising:
   a distance measuring sensor configured to transmit search waves toward an outside of the vehicle and receive reception waves that is caused by reflection of the search waves by the obstacle and has intensity dependent on a distance between the vehicle and the obstacle;
   an imaging section configured to capture an image of surroundings of the vehicle; and
   a detection processing section configured to detect the obstacle reception result of the reception waves obtained by the distance measuring sensor and an imaging result of the image obtained by the imaging section, wherein the detection processing section is configured to
   acquire an estimated reflection position based on the reception result, the estimated reflection position being estimated to be a position in an illuminated region already irradiated with the search waves and on the obstacle at which the reception waves have been reflected,
   recognize an outer shape of the obstacle based on the estimated reflection position,
   perform image recognition of the obstacle based on the imaging result, and
   acquire, based on a recognition result of the outer shape and a result of the image recognition, a relative position, with respect to the vehicle, of a portion of the obstacle included in the image captured by the imaging section, the portion of the obstacle being included in a non-irradiated region ahead of the illuminated region in a vehicle traveling direction.

2. The obstacle detection apparatus according to claim 1, wherein
   the distance measuring sensor is arranged to be shifted from a vehicle center axis toward one side of a vehicle width direction.

3. The obstacle detection apparatus according to claim 1, wherein
   the detection processing section is configured to acquire a relative position of a longitudinal edge with respect to the vehicle as an end position of the obstacle, when in the image captured by the imaging section, the longitudinal edge which is an edge along a vehicle height direction is present at a position on an extension line that is 10 ahead of the estimated reflection position in the vehicle traveling direction and is closer to one side of a vehicle width direction than a vehicle center axis is, the extension line being formed to extend from the estimated reflection position along the outer shape.

4. The obstacle detection apparatus according to claim 1, wherein
   the distance measuring sensor is an ultrasonic wave sensor configured to be capable of transmitting and receiving ultrasonic waves as the search waves and is configured to transmit the search waves along a direction intersecting the vehicle traveling direction.

5. The obstacle detection apparatus according to claim 4, wherein the detection processing section is configured to
   acquire a first estimated reflection position which is the estimated reflection position,
   acquire a second estimated reflection position which is the estimated reflection position ahead of the first estimated reflection position in the vehicle traveling direction, and
   acquire the relative position when the portion of the obstacle included in the image captured by the imaging section is present on an extension line obtained by extending, from the second estimated reflection position in a direction from the first estimated reflection position toward the second estimated reflection position, a line formed by using the first estimated reflection position and the second estimated reflection position.

6. The obstacle detection apparatus according to claim 4, wherein
   the detection processing section is configured to recognize the outer shape based on a straight line that is orthogonal to a line segment connecting the estimated reflection position to the distance measuring sensor and orthogonal to a vehicle height direction and that passes through the estimated reflection position.

7. The obstacle detection apparatus according to claim 1, wherein the detection processing section includes:
   an estimated reflection position acquisition section that acquires the estimated reflection position;
   an image recognition section that three-dimensionally recognizes a shape of the obstacle based on a plurality of images captured by the imaging section while the vehicle is moving; and
   an end recognition section that acquires an end position of the obstacle based on the estimated reflection position acquired by the estimated reflection position acquisition section and an image recognition result obtained by the image recognition section.

8. The obstacle detection apparatus according to claim 1, wherein
   the portion of the obstacle faces the vehicle.

9. The obstacle detection apparatus according to claim 1, wherein the outer shape of the obstacle is recognized based on at least one estimated reflection position sequentially acquired while the vehicle is moving.

* * * * *